US007895760B1

(12) United States Patent
Bareis

(10) Patent No.: US 7,895,760 B1

(45) Date of Patent: Mar. 1, 2011

(54) UNIVERSAL DESIGN SHEET MATERIAL HOLDER ASSEMBLY

(76) Inventor: Kathryn M. Bareis, Eau Claire, WI (US)

(*) Notice: Subject to any disclaimer, the term of this patent is extended or adjusted under 35 U.S.C. 154(b) by 259 days.

(21) Appl. No.: 11/950,612

(22) Filed: Dec. 5, 2007

Related U.S. Application Data

(60) Provisional application No. 60/868,902, filed on Dec. 6, 2006.

(51) Int. Cl.

*B43L 7/00* (2006.01)
*G01C 3/04* (2006.01)
*G01C 3/10* (2006.01)

(52) U.S. Cl. .......................................... 33/494; 33/483

(58) Field of Classification Search ........... 33/484–485, 33/DIG. 1, 18.2, 18.3, 562, 566, 623, 32.1, 33/32.2, 32.7

See application file for complete search history.

(56) References Cited

U.S. PATENT DOCUMENTS

| | | | | | |
|---|---|---|---|---|---|
| 673,941 | A | | 5/1901 | Bellas et al. | |
| 2,763,241 | A | * | 9/1956 | Waggoner | 40/352 |
| 3,147,694 | A | * | 9/1964 | Northup | 100/219 |
| 3,195,022 | A | * | 7/1965 | Staver | 335/285 |
| 3,222,786 | A | * | 12/1965 | Gingras | 33/437 |
| 3,363,319 | A | * | 1/1968 | Greer | 33/437 |
| 3,672,062 | A | * | 6/1972 | Baker | 33/449 |
| 3,826,006 | A | * | 7/1974 | Rushin | 33/437 |
| 3,866,326 | A | * | 2/1975 | Hebel et al. | 33/438 |
| 3,949,629 | A | * | 4/1976 | Johnson | 83/27 |
| 4,267,656 | A | * | 5/1981 | Solomon | 40/352 |
| 4,564,414 | A | * | 1/1986 | Houssian et al. | 33/477 |
| 4,672,747 | A | * | 6/1987 | Turner | 33/1 K |
| 4,892,295 | A | | 1/1990 | Keller | |
| 4,930,382 | A | * | 6/1990 | Collins | 83/13 |
| 4,934,061 | A | * | 6/1990 | Knight et al. | 33/403 |
| 5,000,688 | A | * | 3/1991 | Clamp | 434/164 |
| 5,309,642 | A | * | 5/1994 | McGinnis | 33/32.2 |
| 6,145,799 | A | | 11/2000 | Khon | |
| 6,213,779 | B1 | * | 4/2001 | Campbell et al. | 434/211 |
| 7,086,171 | B2 | * | 8/2006 | Lawson | 33/562 |
| 7,464,480 | B2 | * | 12/2008 | Vetromila | 33/436 |
| 2008/0022542 | A1 | * | 1/2008 | Brosmith et al. | 33/562 |

* cited by examiner

*Primary Examiner*—Yaritza Guadalupe-McCall
(74) *Attorney, Agent, or Firm*—Anthony J. Bourget; Michael T. Hess

(57) ABSTRACT

A sheet material holder assembly comprising a top body having a top surface, a handle projecting generally upward from the top surface, and a first magnetic piece affixed to the top body opposite the top surface and a base having a second magnetic piece, at least a portion of the first magnetic piece aligned atop at least a portion of the second magnetic piece. The base may also include a cradle for receiving a tab of the top body which may be a straightedge having markings. A sheet material may be placed between the top body and the base for use in cutting or other use.

18 Claims, 7 Drawing Sheets

UNIVERSAL DESIGN SHEET MATERIAL HOLDER ASSEMBLY

CROSS-REFERENCE TO RELATED APPLICATIONS

Applicant claims priority based on Provisional Patent Application No. 60/868,902, filed Dec. 6, 2006, the entirety of which is incorporated herein by reference.

BACKGROUND OF THE INVENTION

1. Field of the Invention

The present invention relates generally to sheet material holders and more particularly to a universal design assembly for holding sheet material.

2. Background Information

Holding a sheet of paper or other sheet material in order to cut the material is a task undertaken regularly by many people. Not everyone however is able to hold a sheet of paper, or to hold a sheet of paper or other sheet material in order to cut the paper. Persons having one hand or no hands, or perhaps having other physical limitations find it difficult to make a cut. Persons who have lost a finger, who have a broken arm, who have suffered a stroke or have other physical limitations, whether temporary or permanent, find it difficult to cut a sheet. Persons having cognitive disabilities may not understand the need to hold the sheet as they attempt a cutting action. The task of cutting is further complicated where the sheet must be simultaneously held in one hand while a scissors or cutting instrument is held in another hand. While there have been numerous improvements and varieties of holding devices created over the years, there is a need to create such devices that are workable by all persons, together with a need of having a device that is of a universal design which is acceptable for common use by everyone.

A variety of inventions have been patented which pertain to the use of holding devices. Some of those for which patents have been granted including the following: U.S. Pat. No. 4,892,295 to Keller; U.S. Pat. No. 673,941 to Bellas et al.; and U.S. Pat. No. 6,145,799 to Khon.

The paper cutting assist patented by Keller, U.S. Pat. No. 4,892,295, includes one holding device. The device lacks a handle extending upwards for ease of grasping. While the device hinges a lid and base block which may also be attracted by magnets, the lid and base do not readily detach from each other, especially by a person having limited physical ability. The lid also cannot be used independently from the base. Lifting of the lid block 12 also tends to uplift the entire unit, especially if the magnetic forces are strong. Releasing the lid block can be complicated where the remaining sheet covers the protruding handle 60 extending from an edge 62 opposite the hinge edge 22. A tight and uniform hold along the length of the sheet 28 is uncertain. Accordingly, there is a need to overcome these and other limitations of prior designs. It is a general desire of the present invention to provide a universal design sheet holding assembly that effective and easy for users to use and manipulate. The present invention addresses these and other needs pertaining to the general subject matter as more thoroughly described herein and with respect to the appended claims and abstract.

SUMMARY OF THE INVENTION

The problem of holding and cutting a sheet material with a single hand is solved by an assembly of a top body magnetically detachably connected to a base such that a straight edge of the top body substantially aligns with a straight edge of the base when the top body and base are connected. The assembly allows for a sheet material to be tightly held within the assembly such that a user may run a scissors or blade along the straight edge to cut the material. A user otherwise having limited abilities, such as persons with use of only a single hand, may nonetheless load a sheet material into the holder and subsequently cut the sheet material.

Particular optional embodiments of the invention may include a top body which automatically aligns with the base upon connection so the respective straight edges are aligned. Top body automatically aligns even when turned 180 degrees with respect to the base. Also in particular embodiments, the base includes a cradle, or cradles positioned at either end of the base, and which receive top body in a substantially centering alignment. The cradles accommodate alignment of the respective straight edges. Top body is detachably connected from the base so as to be removable for use in other actions, such as for use as a straightedge independent from the base.

Particular embodiments of the invention may also include a top body which is flexible such that top body may preferably longitudinally bend or flex. Top body may flex especially upon applying force to a handle that projects upwardly from a top surface of the top body. Base may preferably include a clearance to allow a downward flex action along the length of the base. The clearance accommodates top body and base to flex when top body is pressed, such as when a user applies a force to a handle. Grasping the handle and applying a downward force assists a user in subsequently peeling away top body from the base. A user may depress the top body and then simultaneously lift and rotate top body to peel the top body from the base. Thus a single hand movement allows for detachment of top body from the base. In a further aspect, the handle is off-set from a center position to accommodate ease of flexing and lifting of one end of the top body while the top body is otherwise magnetically connected to the base.

A further aspect of the present invention is directed toward a sheet material holder assembly comprising a top body having a top surface, a handle projecting generally upward from the top surface, and a first magnetic piece affixed to the top body opposite the top surface; and a base having a second magnetic piece, at least a portion of the first magnetic piece aligned atop at least a portion of the second magnetic piece.

A further aspect of the invention includes a sheet material holder assembly comprising a top body having a top surface, a handle projecting generally upward from the top surface, the top body including a metal surface opposite the top surface and a base having a second metal surface, at least one of the first and the second metal surfaces including a magnetic surface, the base further having at least one ear projecting generally upward from the base.

A further aspect of the present invention includes a sheet material holder assembly comprising a top body having a top surface, a handle projecting generally upward from the top surface, the top body including a metal surface opposite the top surface and a base having a second metal surface, at least one of the first and the second metal surfaces including a magnetic surface, the base further having a base width substantially equal to a top body width of the top body.

A further aspect of the present invention includes a sheet material holder assembly comprising a top body having a top surface, a handle projecting generally upward from the top surface, the top body including a metal surface opposite the top surface and a base having a second metal surface, at least one of the first and the second metal surfaces including a magnetic surface, the base further including at least one foot projecting opposite the handle, the foot and the base in part defining a clearance.

Yet a further aspect of the present invention includes a sheet material holder assembly comprising a top body having a top surface, a handle projecting generally upward from the top surface, the top surface having evenly spaced apart linear rulings perpendicularly disposed to and extending from an edge of the top body, some of the linear rulings corresponding to a unit of measure, and some of the linear rulings corresponding to a fraction of the unit of measure, the top body including a metal surface opposite the top surface and a base having a second metal surface, at least one of the first and the second metal surfaces including a magnetic surface.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
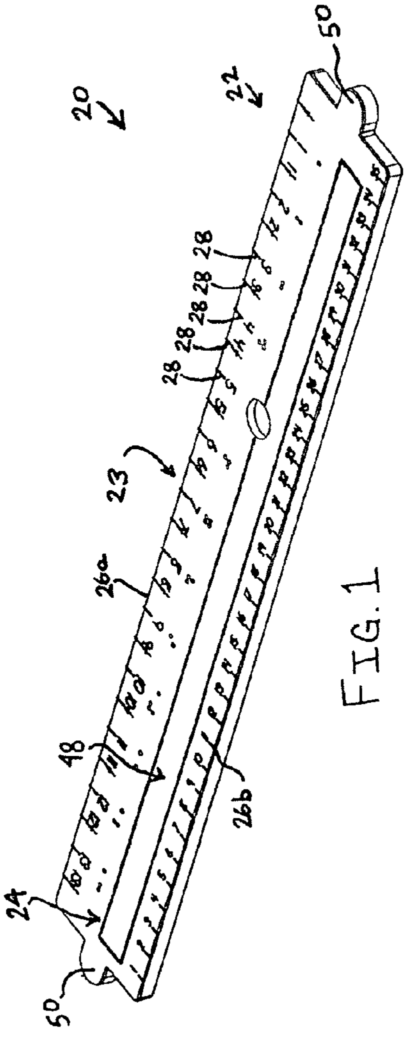
FIG. 1 is a perspective view of a straightedge component used in one embodiment of the present invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

Referring now to the Figures, a sheet material holder assembly according to the present invention is generally depicted with reference to numeral 60. In one aspect, assembly 60 includes a top body 62 in conjunction with a base 70. Preferably top body 62 includes straightedge 20. Preferably straightedge 20 is magnetically drawn or held to base 70. A user may insert a sheet material (sheet not shown) between top body 62 and base 70. The sheet material is thus held in position for a user to mark, cut, or otherwise use the sheet material. It may be appreciated that a variety of types of sheet material may be held in position with assembly 60.

Referring generally to FIG. 1-FIG. 6, a top body 62, and preferably a universal design straightedge for use in the present invention, is generally depicted with reference to numeral 20. Assembly 60, and base 70 are described generally below and with respect to FIG. 7-FIG. 13.

In one aspect, top body 62 or straightedge or ruler 20 includes a body 22 having a top surface 24. Body 22 is preferably of rectangular shape. While body 22 may be made of or include a variety of materials, it is preferably made of flexible, clear, or substantially see-through plastic, and preferably acrylic material. Body 22 preferably has a shape of a common straightedge or ruler device. Straightedge 20 includes a perimeter 23. Body 22 includes at least one straightedge or edge 26, and preferably two edges 26*a*, 26*b* as is common with rulers. Preferably edge 26 is straight along its entire length, without interruption, projections or gaps.

Figure 2:
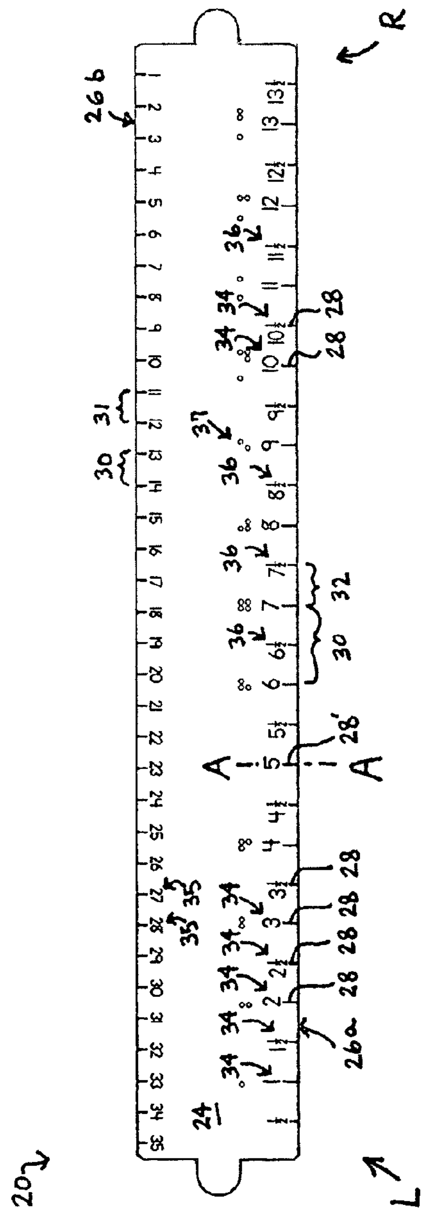
FIG. 2 is a plan view of the straightedge of FIG. 1.

As shown in FIG. 1 and FIG. 2, top surface 24 includes evenly spaced apart linear rulings 28. Rulings 28 are preferably perpendicularly disposed to and extend from edge 26. Preferably rulings 28 extend from edge 26*a* and edge 26*b*. Preferably a plurality of rulings 28 are provided as generally shown. At least some of the rulings 28 correspond to a unit of measure 30 and at least some of the rulings 28 correspond to a fraction of the unit of measure 32. Preferably the unit of measure 30 is an inch or is of English variety. It may be appreciated that the unit of measure 30 may also, or alternatively, include or correspond to a metric measure 31, such as a centimeter or the like. Preferably all rulings 28 correspond to a unit of measure 30 or a fraction of a unit of measure 32. It may be appreciated that rulings 28 extending from edge 26*a* preferably originate from edge 26*a*. It may be appreciated that while rulings 28 may nearly originate from edge 26*a*, rulings 28 preferably originate at edge 26*a* as shown. The terminology in the claims pertaining to rulings "extending from said edge" may be interpreted to include a relationship where the rulings 28, or some of them, originate or nearly originate at edge 26*a*.

Top surface 24 also includes numerical indicia 34. Preferably a plurality of indicia 34 are provided as generally shown. It may be appreciated that straightedge 20 may be of greater or lesser length having any desired number of rulings 28 and indicia 34. Preferably indicia 34 are associated with substantially all of the rulings 28, and more preferably each ruling 28 includes an associated indicia 34. Respective indicia 34 are associated with respective rulings 28, and preferably positioned adjacent respective rulings 28. More preferably, substantially all of indicia 34 are substantially centered about a centerline of respective rulings 28. As shown in FIG. 2, a representative numerical indicia "5" is associated with a ruling 28'. Ruling 28' defines a centerline generally along line A-A. Preferably the representative numeral "5" is centered along line A-A. It may be appreciated that such centered association makes the indicia-to-rulings representation easier to comprehend, understand or review as opposed to an association not so centered. Preferably each indicia-to-ruling association is centered. Preferably each ruling 28 includes an indicia 34. Preferably, indicia 34 include a font that is being taught to students in their respective schools or curricula. Most preferably, indicia 34 comprise a Zaner-Blozer font (for ease of understanding and importantly for use of the open "4" numeral). Other fonts such as a Danelian font which includes a "monkey tail" feature on the "a" character (useful for introducing students to cursive writing) may also be preferred.

As shown in FIG. 2, straightedge 20 is arranged with edge 26*a* in an underlying orientation with respect to numerical indicia 34. Particularly, indicia 34 are in a "standard upright reading position" with respect to edge 26*a*, as opposed to an upside-down viewing position. It may be appreciated that alternate numeric indicia 35, disposed opposite edge 26*a*, are in an upside-down reading position with respect to edge 26*a*. Edge 26*a* is thus in an underlying orientation with respect to indicia 34. It may be appreciated that orienting indicia 34 in a standard upright viewing position with respect to rulings extending from associated edge 26*a* makes for easier comprehension, understanding and review of the indicia 34. Preferably, numerical indicia 34 increase in value from left L to right R with each successive ruling 28 where straightedge 20 is arranged with edge 26*a* in an underlying orientation with respect to numerical indicia 34.

As further shown in FIG. 2, top surface 24 preferably includes numerical indicia 34 associated with linear rulings 28 corresponding to a fraction of unit measure 32. Preferably, such numerical indicia 34 include a composite of full and fractional numerical indicia 36. Preferably, composite indicia 36 include values such as 1⁄1;2, 2⁄1;2, 3⁄1;2, 4⁄1;2, 5⁄1;2, 6⁄1;2, 7⁄1;2, 8⁄1;2, 9⁄1;2, 10⁄1;2, 11⁄1;2, 12⁄1;2, and 13⁄1;2, etc. While it may be appreciated that any number of composite indicia 36 may be used depending on the length of straightedge 20, preferably straightedge 20 includes at least composite indicia of at least 1½, 2½, 3½, and 4½. Preferably composite indicia 36 are centered about a centerline of respective linear rulings 28 as shown. Most preferably, the fractional component (including but not limited to "½") of composite 36 is centered about a centerline of ruling 28. It may be appreciated that such centerline alignment makes for easier comprehension, understanding and review of the indicia 34 and composite indicia 36. More particularly, having both the full and fractional components of the composite indicia 36 make comprehension of the associated value abundantly clear or at least assists persons who have difficulty distinguishing between fractional values located between full values or whole numbers. Otherwise, for instance, the value "½" lying between two whole numbers, such as between "8" and "9", might be interpreted by some individuals as either "8½" or "9½". With the subject invention, however, the value "8⁄½" is expressly stated so there can be little if any uncertainty. Preferably, linear rulings 28 corresponding to a fractional unit of measure 32 have a length shorter than a length of linear rulings 28 corresponding to a unit of measure 30. Preferably indicia 34 associated with a fractional unit of measure 32 are positioned closer to edge 26*a*. Preferably top surface includes Braille characters 37 or values as shown. Character 37 is but one representation of such values, and in the case of character 37, represents the numerical value "9". Preferably rulings 28 and indicia 34 are raised from top surface 24 for a textured feature, or alternatively etched or recessed. Preferably rulings 28 and indicia 34 include a contrasting color as compared to top surface 24. Top surface 24 is preferably clear or transparent.

Preferably top surface 24 includes a textured area 48. Textured area 48 may include a buffed or blasted region of body 22, ideal for accepting markings of a pen, pencil or marker or the like. Area 48 allows for an instructor to place a mark adjacent a desired ruling 28 for instruction or guiding purposes. A typical area 48 may be formed by sand blasting or other scoring of top surface 24, and preferably creates an opaque region on surface 24.

Figure 3:
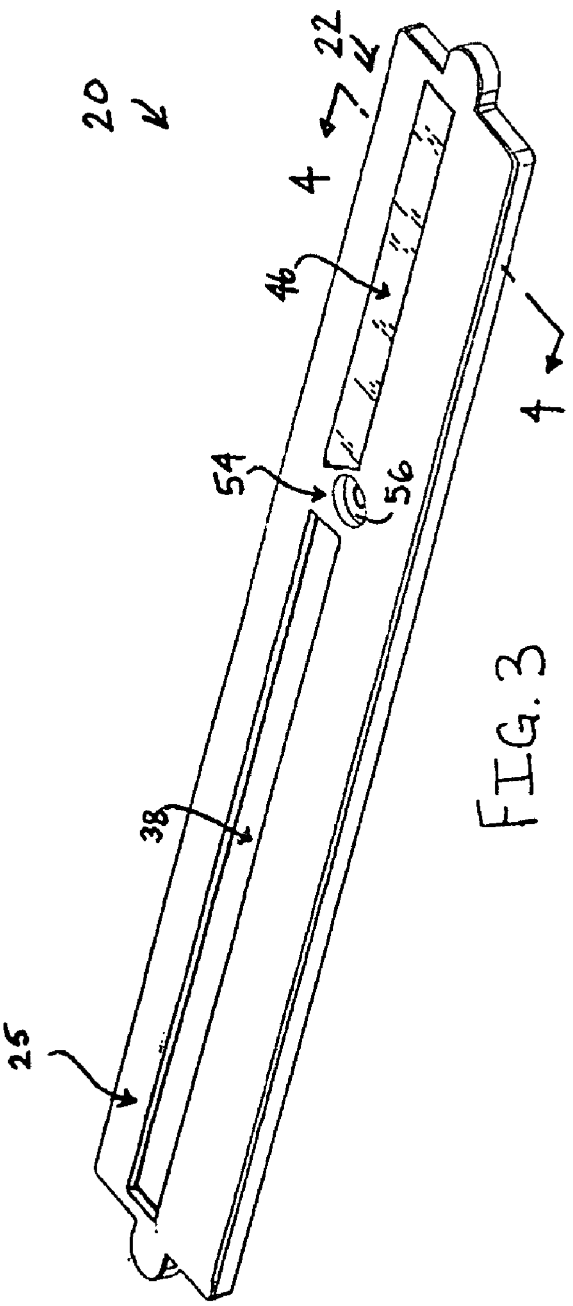
FIG. 3 is a bottom perspective view of the straightedge of FIG. 1.

Referring now to FIG. 3, straightedge 20 includes bottom surface 25. A groove 38 is preferably defined within surface 25. Preferably a metal piece, and more preferably a metal strip 46, is positioned within groove 38. While groove 38 may be a rectangular area of varying dimension, it may be appreciated that other configurations are contemplated. It may also be appreciated that metal strip 46 may be of varying dimension as desired, and is preferably a metal strip as generally shown. Preferably metal strip 46 is a magnetic strip. It may be appreciated that magnet 46 is positioned within groove 38. It may be appreciated that a magnet 46 may also be positioned within groove 38. It may also be appreciated that groove 38 and a corresponding magnet may run the entire length, or substantially the entire length of straightedge 20. Preferably groove 38 includes a colored or painted layer (not shown) upon which strip 46 is positioned. A colored layer assist in concealing strip 46 from clear view and brightens straightedge 20 where use of a dark color strip or magnet 46 is required. A magnet is preferably used so that straightedge 20 may be held in place on a metal surface or object or other object or surface having a metal or magnet. Straightedge 20 having a magnet may also hold a sheet material placed between straightedge 20 and a surface. While not preferred, it may be appreciated that bottom surface 25 may also include a layer (not shown) covering the metal surface 46. Metal surface 46, while still being a bottom surface, may thus also be embedded within body 22.

Figure 4:
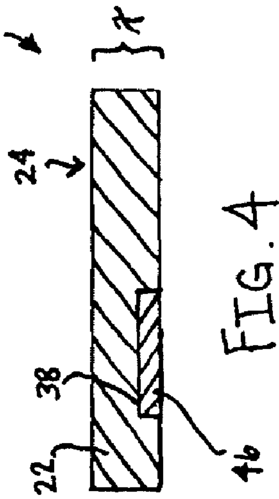
FIG. 4 is a section view taken along line 4-4 of FIG. 3.

Referring to FIG. 4, metal strip 46 is preferably off-set from a centerline of straightedge 20. Such off-set arrangement is useful where straightedge 20 is placed upon an object having a similar metal strip which may be magnetized so as to accommodate attraction between the respective strips.

Figure 5:
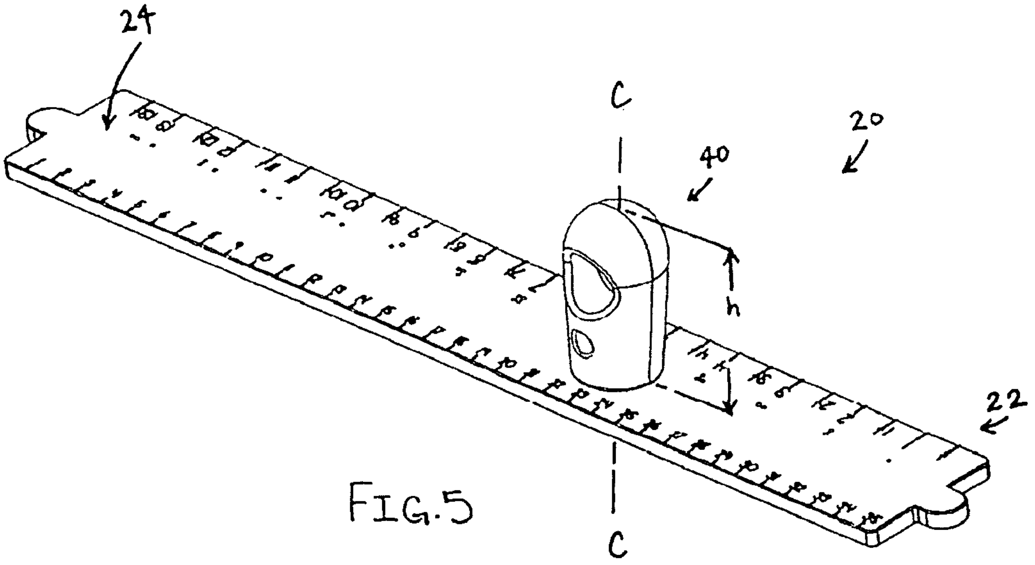
FIG. 5 is a perspective view of a further straightedge component used in an embodiment of the present invention.

Referring to FIG. 5, a further aspect of the invention is shown. Straightedge 20 includes a handle 40 positioned atop top surface 24. Handle 40 projects generally upward from top surface 24, and preferably handle 40 projects generally perpendicularly from top surface 24. Preferably handle 40 is off-set from a center point of top surface 24. Having such off-set feature accommodates for a desired flexing of body 22 where desired.

Figure 6:
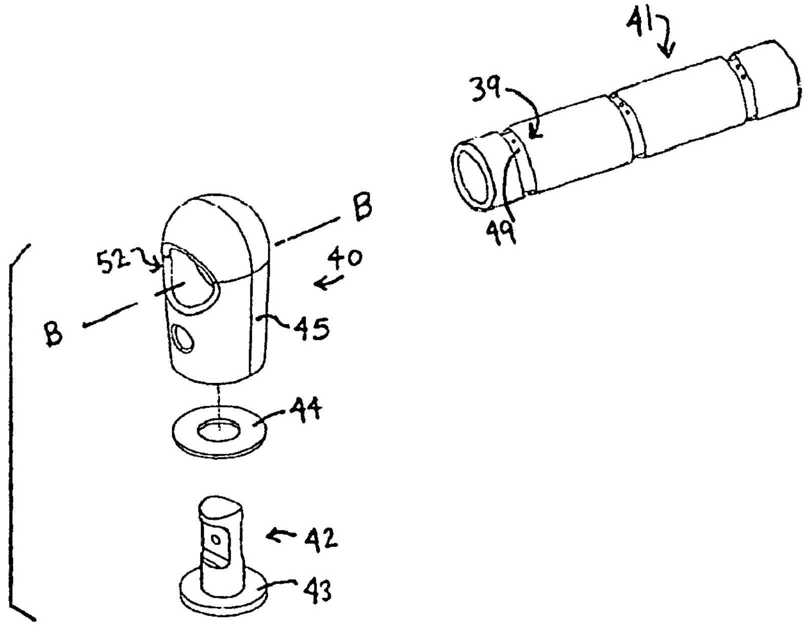
FIG. 6 is an exploded perspective view of a handle aspect of the present invention.
Figure 7:
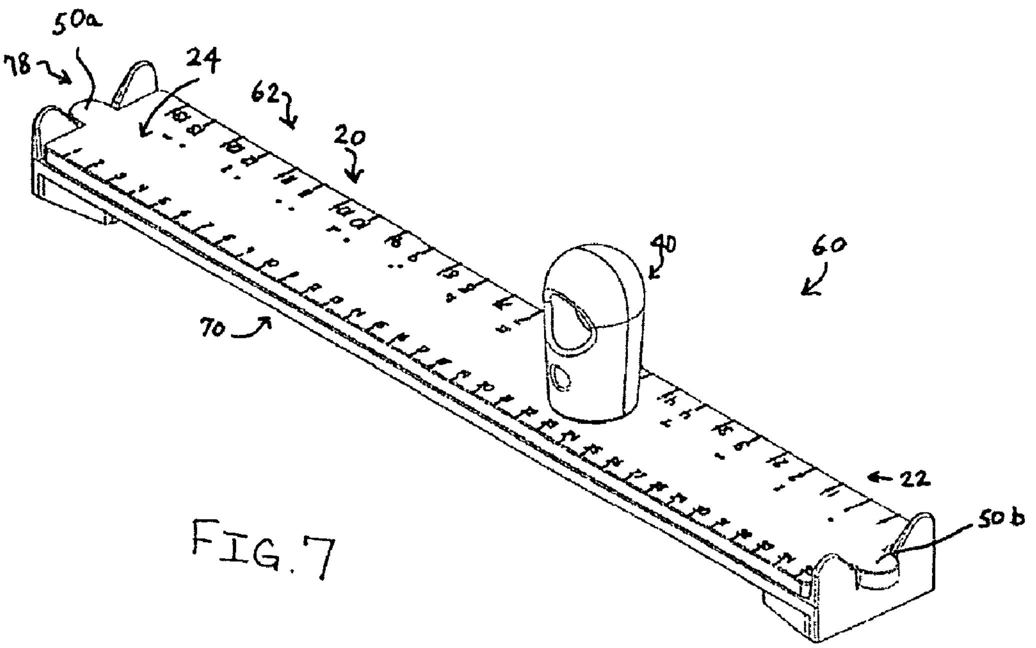
FIG. 7 is a perspective view of a sheet material holder assembly of one embodiment of the present invention.

Preferably handle 40 is spinably connected to straightedge 20. Preferably handle 40 spins about a central axis C-C as shown in FIG. 5. Preferably handle 40 includes a base portion that is generally cylindrical or includes a slightly upward tapered cylindrical component. Preferably handle 40 includes a bore 52 having a central axis B-B aligned substantially parallel with top surface 24. Preferably handle 40 has a height "h" substantially greater than a thickness "x" of body 22. In one non-limiting example, as shown in FIG. 5, base 22 has thickness or about ¼ inch whereas handle 40 has a height of about 2 inches. Preferably handle has height at least twice the measure of thickness "x", and more preferably greater than four times the measure of thickness "x". Such dimensions enhance the usefulness of handle 40 so an individual may use a variety of grips or grasps when manipulating straightedge 20. Preferably handle 40 includes T-bar 41 which inserts within bore 52. T-bar 40 may be inserted at a midpoint of as shown or off-set to accommodate a desired grasp. T-bar preferably includes grooves with nubs or tabs to engage a corresponding tab within bore 52 to secure T-bar 41 in position. As handle 40 is swiveled, bore 52 is realigned, thus accommodating a variety of grasping arrangements for T-bar 41. As shown in FIG. 6, a post 42 having lip 43 may be inserted within aperture 54 (see FIG. 3) to receive handle 40. Preferably lip 43 abuts a shelf 56 within aperture 54 where remainder of post 42 extends therethrough. Preferably a spacer 44 or washer is included to accommodate for spin of handle about axis C-C. A set screw (not shown) or other fastener may be used to secure handle 40 to post 42. It may be appreciated that other mechanisms for affixing handle 40 to straightedge 20 may be used without departing from the invention.

Assembly 60, and base 70, are described generally below and with respect to FIG. 7-FIG. 13 and with respect to FIG. 1-FIG. 6 concerning top body or straightedge 20. Assembly 60 includes top body 62 preferably including straightedge 20 which engages with base 70. Base 70 is configured to receive straightedge 20 and is preferably made of the same or similar materials and of generally the same or similar dimensions. Base includes a body 64 having a base top surface 66. Body 64 is preferably of rectangular shape. While body 64 may be made of or include a variety of materials, it is preferably made of flexible, clear, or substantially see-through plastic, and preferably acrylic material. Body 64 preferably has a shape of a common straightedge or ruler device. Body 64 preferably includes at least one straightedge or base edge 27, and preferably two edges 27*a*, 27*b* as is common with rulers and preferably to match overlaying straightedge 20. Preferably edge 27 is straight along its entire length, without interruption, projections or gaps. Preferably straightedge 20 and base 70 have a similar or identical width "w" and thickness "x". Preferably straightedge 20 and base 70 have similar length measurements as may be appreciated.

Figure 8:
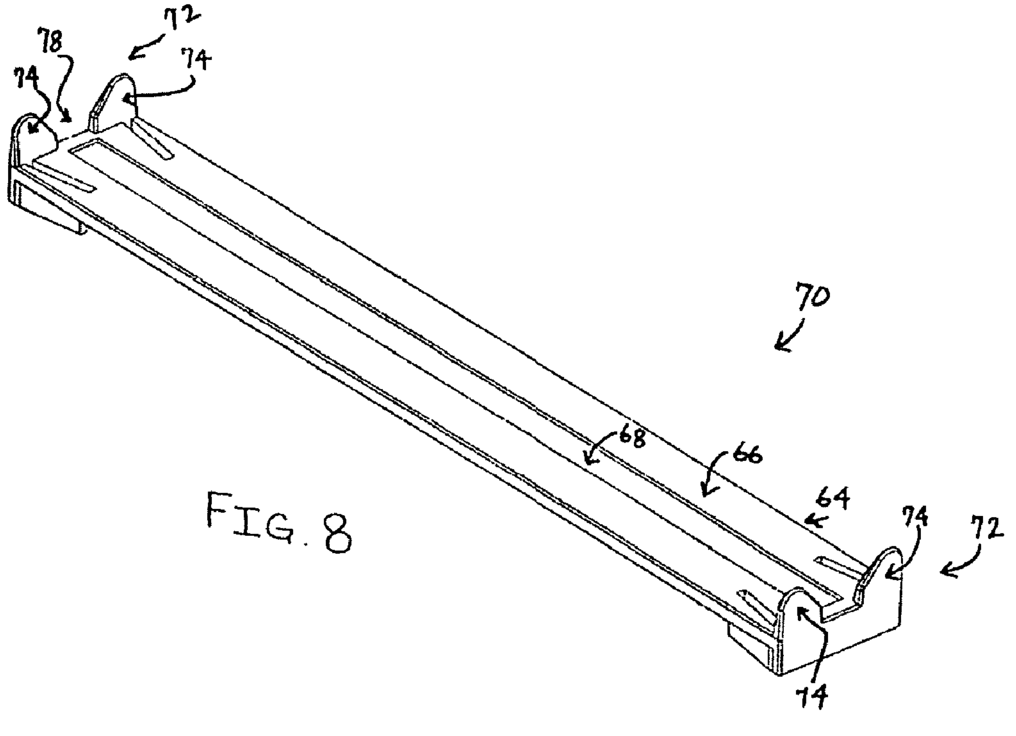
FIG. 8 is a perspective view of a base component used in the assembly of FIG. 7.

Referring to FIG. 8, base 70 preferably includes base groove 68 preferably defined within surface 66. Preferably a metal piece, and more preferably a metal strip 47, is positioned within groove 68. While groove 68 may be a rectangular area of varying dimension, it may be appreciated that other configurations are contemplated. It may also be appreciated that metal strip 47 may be of varying dimension as desired, and is preferably a metal strip as generally shown. Preferably metal strip 47 is a magnetic strip. It may be appreciated that magnet 47 is positioned within groove 68. It may be appreciated that a magnet 47 may also be positioned within groove 68. It may also be appreciated that groove 68 and a corresponding magnet may run the entire length, or substantially the entire length of base 70. A magnet is preferably used so that straightedge 20 (having a metal piece or strip, which may or may not be magnetic, but which is preferably magnetic), may be held in place on base 70. A sheet material placed between straightedge 20 and base 70 may therefore be held in position.

With further reference to FIG. 8, base 70 preferably includes a cradle 72, and preferably two cradles 72 positioned at either of opposing ends of base 70. Cradle 72 includes at least one ear 74. Preferably ear 74 projects upward, and preferably perpendicularly from base and body 64. It may be appreciated that a pair of ears 74 define cradle 72. Ear 74 preferably includes converging edge 76. Preferably converging edges 76 lead to and define in part gap 78. Preferably straightedge 20 includes tabs 50 positioned within cradle 78. Preferably cradles 72*a* and 72*b* are symmetrical. Preferably straightedge 20 is symmetrical from side to side such that it may be rotated so tab 50*a* may alternatively lie within either cradle 72*a* or cradle 72*b* while tab 50*b* may alternatively lie within the reverse. Cradles 72 accommodate for quick and efficient alignment of straightedge 20 upon base 70. Preferably gaps 78 are positioned substantially in-line along a central longitudinal axis of base 70. Preferably metal piece 47, which is preferably a magnetic strip 47, is inserted within groove 68 which is also aligned along a central longitudinal axis of base 70.

Figure 9:
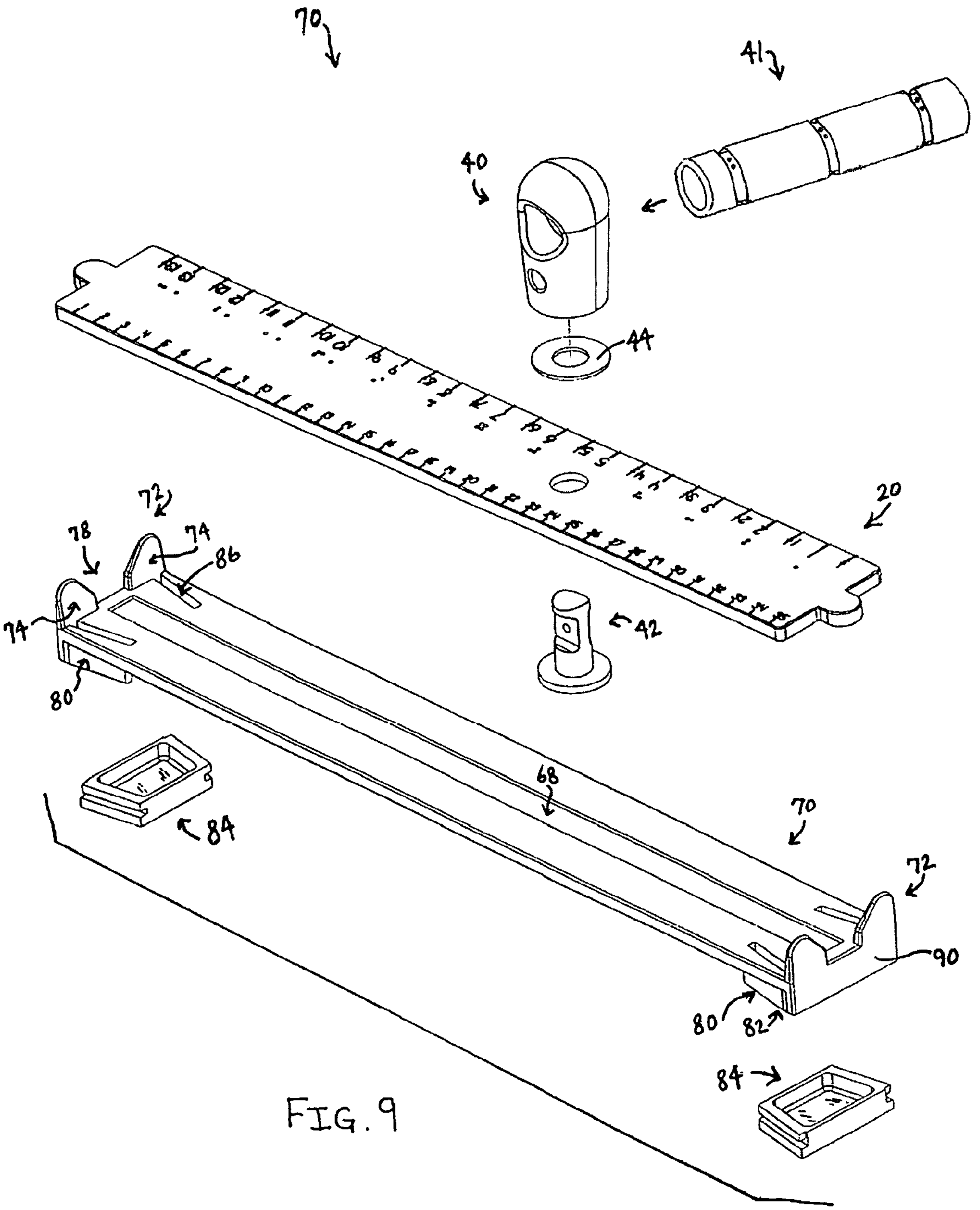
FIG. 9 is an exploded view of the assembly of FIG. 7 including an optional T-bar.

Referring to FIG. 9 and exploded view of the assembly 70 is shown. It may be appreciated that handle 40 is affixed to straightedge 20. Straightedge 20 in turn may be set upon base 70. Preferably respective magnetic strips 46, 47 operate to hold a sheet material placed therebetween.

Figure 10:
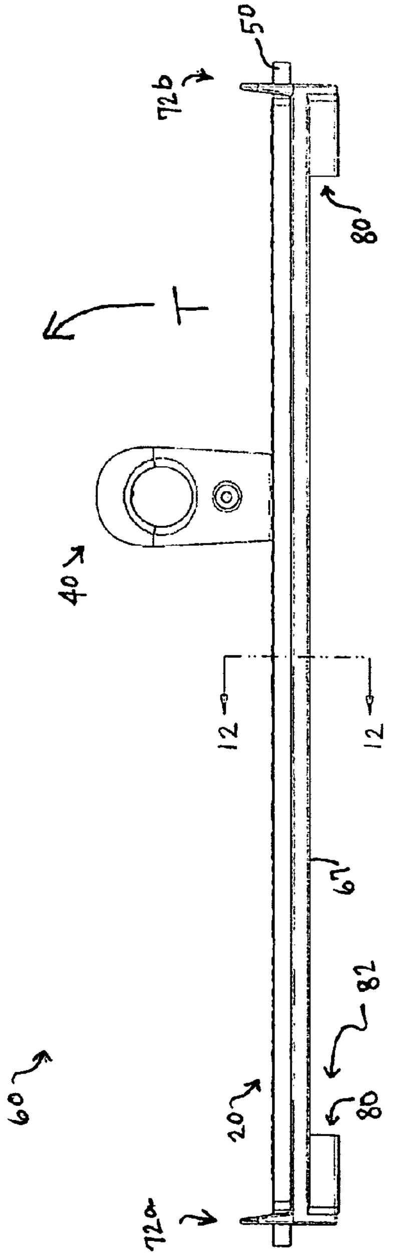
FIG. 10 is an elevation view of the assembly of FIG. 7.

Referring to FIG. 10, base 70 may include foot 80 positioned opposite base top surface 66. Foot 70 and base bottom surface 67 define a clearance 82. Preferably opposing feet 70 are placed at opposite ends of base 70 as shown. It may be appreciated that the magnetic attraction between straightedge 20 and base 70 may be relatively strong, thus making separation of straightedge 20 from base 70 difficult. A greater magnetic attraction is desired in order to securely hold a sheet material in position; however a large magnetic attraction tends to make separation of straightedge 20 and base 70 increasingly difficult. Preferably assembly 60 includes a handle 40.

In accordance with a preferred aspect of the invention, straightedge 20 and base 70 are made of flexible material, and are preferably longitudinally flexible. Clearance 82 thus assists a user when attempting a separation. To assist in overcoming the magnetic attraction, the user may simply grasp handle 40, and by applying a slight pressure thereto, lift straightedge 20 in the direction generally represented by the arrow "T." Accordingly, top body 20 is "longitudinally flexible" in that one end of body 20 (such as that end located adjacent cradle 72*b*) may bend upward relative to the opposite end of the body (i.e., the opposite end of body 20 located adjacent cradle 72*a*), and vice-versa. Clearance 82 assists in base 70 flexing downward in the direction opposite arrow T, thereby allowing a user to obtain a greater separation angle to peel back of body or straightedge 20. The inventor has discovered that absence of clearance 82 would tend to make such peel back more difficult thus requiring greater force and difficulty in use of the sheet holding device. The inventor has also discovered that having handle 40 off-set from a center-point of straightedge 20 assists a user in bending straightedge 20 longitudinally so as to create a greater splitting force at one end of straightedge as compared to an opposite end so as to operate a peel-back of the straightedge 20 from the magnetic strip 47 located in base 70. An optional T-bar 41 provides for additional grasping configuration so a user may impart a greater lifting force if needed. Handle 40 which swivels about central axis C further assists a user in positioning his or her hands upon or about handle 40 since greater variety of positions are made possible. Preferably T-bar 41 includes slots 39 which lie around the generally cylindrical element and also nubs 49 which align with a bump or tab within bore 52 for a secure engagement.

Feet 80 also assist in suspending assembly 60 from the plane of a table surface (not shown) or the like. Feet 80 may also be of rubber material to limit slipping of device. A complementary cutting instrument, especially of the type shown in the patents to Applicant, U.S. Pat. Nos. 6,684,512 and 6,952,878 may therefore be used to pass along assembly 60 to cut a sheet material. Feet 80 position the sheet material for ease of entry into a cutting notch of the patented cutting devices. Assembly 60 maintains a sheet material in a relatively very flat orientation to assist in the cutting operation. Applicant has discovered that less effort is required to cut a sheet where the sheet is held flat and tight. Use of double magnetic strips also hold the sheet very tight which is needed for a cutting operation. The feet 80 also provide the clearance use of standard scissors to undertake a cutting operation. While the present invention has special advantage for the holding of sheet material, it works especially well in conjunction with other adaptive or universal design equipment.

Feet 80 include a cavity 82 in which gripper 84 inserts. Preferably gripper 84 is made of a rubber or soft material and presents an enhanced friction force upon a table or other surface upon which base 70 is placed. Without gripper 84, base 70 would tend to more easily slide about when operating assembly 60. Gripper 84 assist a user in peeling away straightedge 20 since gripper 84 resists movement allowing for an easier bend of straightedge 20 when lifting in direction of arrow T. Preferably gripper 84 is angled to friction fit within cavity 82 with includes opposing t-rails 88. Grippers 84 insert or plug into cavity 82. Production slots 86 may also be formed in base 70 in order to assist in the molding fabrication or increase the release time in a production of the invention. It may be appreciated that a user may separate straightedge 20 from assembly 60 to be used independently for a measuring, drawing, cutting, holding or other operation.

Figure 11:
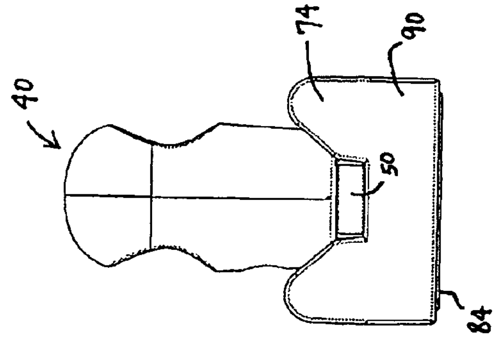
FIG. 11 is an end view of the assembly of FIG. 7.

Referring to FIG. 11 ear 74 of cradle 72 is positioned generally perpendicular to tab 50. Gripper 84 extends slightly below base end wall 90.

Figure 12:
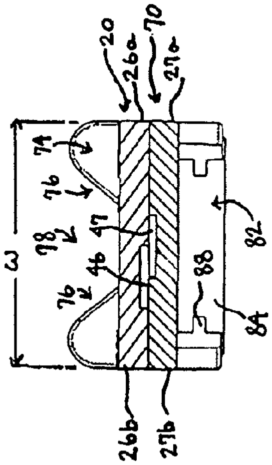
FIG. 12 is a section view taken along line 12-12 of FIG. 10.

Referring to FIG. 12, metal strip 46 of straightedge 20 is positioned adjacent base 70 and base metal strip 47 is positioned adjacent straightedge 20. Metal strip 47 is preferably positioned along a central longitudinal axis of base 70. As shown, strip 46 and strip 47 are in magnetic attraction. While not required, piece 46 preferably contacts piece 47. Preferably at least a portion of piece 46 is aligned atop at least a portion of piece 47. It may be appreciated that the attractive forces of magnetized pieces 46, 47 may operate while such pieces are not in contact, and may also operate where one or the other or both are embedded within respective body 22, 64. Metal strip 46 may be off-set from a central longitudinal axis of straightedge 20. Such off-set is preferred where the magnetic properties of the respective metal strips 47, 46 act to repel or attract as understood by one having skill in the art. A more refined or expensive variety of strips 46, 47 may be used to allow for a direct overlying relationship without having a repelling action. It may be appreciated that gap 78 further assists in maintaining straightedge 20 in alignment with base 70. Edge 26*a* and base edge 27*a* are preferably aligned to define a common plane.

Figure 13:
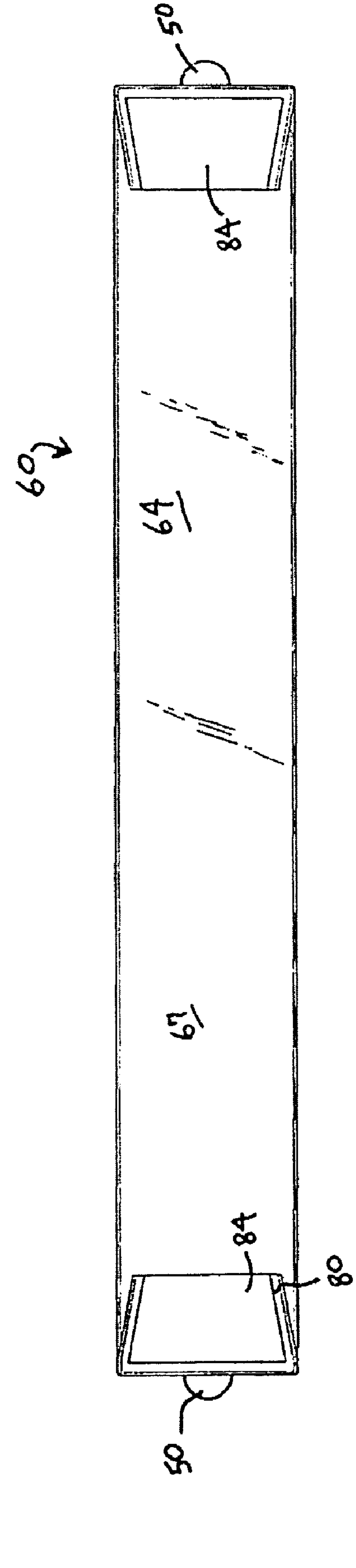
FIG. 13 is a bottom view of the assembly of FIG. 7.

Referring to FIG. 13, the taper associated with foot 80 is shown. Such taper assists in retaining gripper 84. In a preferred aspect, body 64 is clear such that a user may see marking through base 70 to assist in cutting, measuring and the like.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A sheet material holder assembly comprising:
a top body magnetically detachably connected to a base such that a straight edge of said top body substantially aligns with a straight edge of said base when said top body and base are connected;
a tab extending from said top body;
a cradle projecting from a first surface of said base toward said top body, and said cradle defines a gap therein, and
when said top body and said base are connected said gap receives said tab,
where said base is longitudinally flexible and defines a clearance between said base and a surface upon which said base rests, and
where said top body is longitudinally flexible and includes a handle which is off-set from a center position of said top body and projects generally upward from a top surface of said top body.

2. The assembly of claim 1 further comprising said cradle automatically aligning said straight edge of said top body with said straight edge of said base upon connection of said top body to said base.

3. The assembly of claim 1, further comprising:
where said tab is integrally formed with said top body, and
when said top body and said base are connected said tab extends through said gap.

4. A sheet material holder assembly comprising:
a top body having a top surface, a handle projecting generally upward from said top surface, and a first magnetic piece affixed to said top body opposite said top surface; and
a base having a first end and a second end, and said first end and said second end are separated by an elongated portion of said base;
said base having a second magnetic piece extending between said first end and said second end;
at least a portion of said first magnetic piece aligned atop at least a portion of said second magnetic piece; and
at least a first cradle positioned at said first end of said base, and said first cradle extends from said base in a direction of said top body, and
where said base has a base width substantially equal to a top body width of said top body, and where said top body is a straightedge.

5. The assembly of claim 4 where said first magnetic piece and said second magnetic piece are magnetic strips spanning substantially the length of said assembly.

6. The assembly of claim 4 further comprising said first cradle comprising at least a first ear projecting generally perpendicularly from said base and at least a second ear projecting generally perpendicularly from said base.

7. The assembly of claim 6 where said first cradle includes converging edges leading to a gap, said gap positioned substantially in-line with said second magnetic piece, said second magnetic piece aligned along a central longitudinal axis of said base.

8. The assembly of claim 6 where said first cradle defines a gap, said gap substantially centered about a central longitudinal axis of said base.

9. The assembly of claim 4 where said top body is made of plastic.

10. The assembly of claim 4, further comprising:
where said handle projects generally perpendicularly from said top surface and is positioned off-set from a center point of said top body.

11. The assembly of claim 4, further comprising:
where said base includes at least one foot positioned opposite said second magnetic piece, said foot and said base in part defining a clearance.

12. A sheet material holder assembly comprising:
a top body having a top surface, a handle projecting generally upward from said top surface, and a first magnetic piece affixed to said to body opposite said to surface; and
a base having a first end and a second end, and said first end and said second end are separated by an elongated portion of said base;
said base having a second magnetic piece extending between said first end and said second end;
at least a portion of said first magnetic piece aligned atop at least a portion of said second magnetic piece; and
at least a first cradle positioned at said first end of said base, and said first cradle extends from said base in a direction of said top body, and
where said handle projects generally perpendicularly from said top surface and is positioned off-set from a center point of said top body.

13. A sheet material holder assembly comprising:

a top body having a to surface, a handle projecting generally upward from said top surface, and a first magnetic piece affixed to said top body opposite said top surface; and a base having a first end and a second end, and said first end and said second end are separated by an elongated portion of said base;

said base having a second magnetic piece extending between said first end and said second end;

at least a portion of said first magnetic piece aligned atop at least a portion of said second magnetic piece; and at least a first cradle positioned at said first end of said base, and said first cradle extends from said base in a direction of said top body, and where said base includes at least one foot positioned opposite said second magnetic piece, said foot and said base in part defining a clearance.

14. A sheet material holder assembly comprising:

a top body having a top surface, a handle projecting generally upward from said top surface, said top body including a metal surface opposite said top surface; and a base having a second metal surface, at least one of said first and said second metal surfaces including a magnetic surface;

said base further defining a first cradle having converging edges defining a first gap, and said base further defining a second cradle having converging edges defining to a second gap, and where said first cradle includes at least one ear projecting generally upward and perpendicularly from said base.

15. The assembly of claim 14 where said second cradle is positioned opposite said first cradle.

16. The assembly of claim 14 where said gap is positioned substantially in-line with said second metal surface, said second metal surface being a strip aligned along a central longitudinal axis of said base.

17. The assembly of claim 14 where said base defines a clearance between said base and a surface upon which said base rests.

18. The assembly of claim 14 where said top surface includes evenly spaced apart linear rulings perpendicularly disposed to and extending from an edge of said top body, some of said linear rulings corresponding to a unit of measure, and some of said linear rulings corresponding to a fraction of the unit of measure.

* * * * *